(12) United States Patent
Lelescu et al.

(10) Patent No.: US 8,131,097 B2
(45) Date of Patent: Mar. 6, 2012

(54) METHOD AND APPARATUS FOR EXTENDED DEPTH-OF-FIELD IMAGE RESTORATION

(75) Inventors: Dan Lelescu, Morgan Hill, CA (US); Robert Mullis, Soquel, CA (US); Pravin Rao, San Jose, CA (US); Kartik Venkataraman, San Jose, CA (US); Cheng Lu, Santa Clara, CA (US); Junqing Chen, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 919 days.

(21) Appl. No.: 12/128,234

(22) Filed: May 28, 2008

(65) Prior Publication Data
US 2009/0297056 A1   Dec. 3, 2009

(51) Int. Cl.
*G06K 9/40*   (2006.01)
(52) U.S. Cl. .................................................. 382/254
(58) Field of Classification Search ........... 382/254–275
See application file for complete search history.

(56) References Cited

U.S. PATENT DOCUMENTS

| | | | |
|---|---|---|---|
| 5,414,782 A * | 5/1995 | Carasso | 382/270 |
| 5,576,548 A | 11/1996 | Clarke et al. | |
| 5,787,208 A * | 7/1998 | Oh et al. | 382/257 |
| 6,069,738 A | 5/2000 | Cathey, Jr. et al. | |
| 6,927,922 B2 | 8/2005 | George et al. | |
| 7,158,317 B2 | 1/2007 | Ben-Eliezer et al. | |
| 7,180,673 B2 | 2/2007 | Dowski, Jr. | |
| 7,218,448 B1 | 5/2007 | Cathey, Jr. et al. | |
| 2005/0276506 A1 * | 12/2005 | Kwon et al. | 382/269 |
| 2006/0013479 A1 * | 1/2006 | Trimeche et al. | 382/167 |
| 2007/0165961 A1 * | 7/2007 | Lu | 382/254 |
| 2008/0013850 A1 * | 1/2008 | Sakurai et al. | 382/255 |
| 2008/0232707 A1 * | 9/2008 | Lee et al. | 382/255 |
| 2008/0253649 A1 * | 10/2008 | Wang et al. | 382/167 |
| 2010/0284626 A1 * | 11/2010 | Malm et al. | 382/261 |

FOREIGN PATENT DOCUMENTS

JP   62067513 A   *   3/1987
WO   WO 2008/042137 A2   4/2008

OTHER PUBLICATIONS

Vincenzi, Donato, et al., "Extended Depth-of-Field Optical Reader Exploiting Digital Image: Deconvolution;" 1-4244-1300 2007 IEEE, pp. 146-149.
Bradburn, Sara, et al., "Realizations of Focus Invariance in Optical/Digital Systems with Wavefront Coding," Imaging Systems Laboratory Optoelectronic Computing Systems Center, Department of Electrical and Computer Engineering, Univ. of Colorado at Boulder (22 pages).

* cited by examiner

Primary Examiner — Jingge Wu

(57) ABSTRACT

A method and apparatus are disclosed for restoring an image captured through an extended depth-of-field lens. Preprocessed data relating to image degradation is stored and used during an image restoration process.

9 Claims, 13 Drawing Sheets

| 1a | 2a | 3a | 4a | 4c | 3c | 2c | 1c |
|----|----|----|----|----|----|----|----|
| 5a | 3e | 6a | 7a | 7c | 6c | 3f | 5c |
| 8a | 4e | 7e | 9a | 9c | 7f | 4f | 8c |
| 8b | 4g | 7g | 9b | 9d | 7h | 4h | 8d |
| 5b | 3g | 6b | 7b | 7d | 6d | 3d | 5d |
| 1b | 2b | 3b | 4b | 4d | 3d | 2d | 1d |

| 9a | 8a | 6e | 3e | 3f | 6f | 8c | 9c |
|----|----|----|----|----|----|----|----|
| 7a | 6a | 5a | 2e | 2f | 5c | 6c | 7c |
| 4a | 3a | 2a | 1a | 1c | 2c | 3c | 4c |
| 4b | 3b | 2b | 1b | 1d | 2d | 3d | 4d |
| 7b | 6b | 5b | 2g | 2h | 5d | 6d | 7d |
| 9b | 8b | 6g | 3g | 3h | 6h | 8d | 9d |

FIG. 12

| →1a | →2a | →3a | →4a | ←4c | ←3c | ←2c | ←1c |
|-----|-----|-----|-----|-----|-----|-----|-----|
| →5a | ↓3e | →6a | →7a | ←7c | ←6c | ↑3f | ←5c |
| →8a | ↓4e | ↓7e | →9a | ←9c | ↑7f | ↑4f | ←8c |
| 8b →| ↓4g | ↓7g | 9b →| 9d ←| ↑7h | ↑4h | 8d ←|
| 5b →| ↓3g | 6b →| 7b →| 7d ←| 6d ←| ↑3h | 5d ←|
| 1b →| 2b →| 3b →| 4b →| 4d ←| 3d ←| 2d ←| 1d ←|

FIG. 13

METHOD AND APPARATUS FOR EXTENDED DEPTH-OF-FIELD IMAGE RESTORATION

FIELD OF THE INVENTION

Disclosed embodiments relate to image processing for digital cameras using extended depth of field (EDOF) lenses.

BACKGROUND OF THE INVENTION

Cameras having extended depth-f-field (EDOF) lenses can capture images having objects at both near and far distances from the camera, where the objects remain in focus. A property of an EDOF camera is that the optics design implements a particular tradeoff among its parameters (described below), and subsequent signal processing must take into account this trade-off in order to obtain good quality images having the extended depth of field effect. The optics, imaging sensor, and signal processing module constitute an EDOF imaging system.

The EDOF lens optics are designed such that a tradeoff is made between the peak-sharpness of the EDOF lens, and the invariance of the optical point spread functions (PSFs) of the lens with the distance to an object in a scene. A PSF is an array of numbers that describe the quality and quantity of blurring of a received image at each point of a scene. The manifestation of this trade-off is that the EDOF camera system, while achieving a greater depth of field, also has PSFs in a range around best focus, that are broader compared to a conventional lens PSF at best focus.

Accordingly, there is a need and desire for an extended depth-of-field (EDOF) imaging system that can account for the trade-off between peak sharpness and extended depth-of-field to recover focus in recaptured images.

BRIEF DESCRIPTION OF THE DRAWINGS

FIG. 12 is a block diagram of indexing according to an embodiment described herein.

FIG. 13 is a block diagram of indexing according to an embodiment described herein.

DETAILED DESCRIPTION OF THE INVENTION

In the following detailed description, reference is made to the accompanying drawings, which form a part hereof and show by way of illustration specific embodiments that may be practiced. These embodiments are described in sufficient detail to enable those skilled in the art to practice them, and it is to be understood that other embodiments may be utilized, and that structural, logical, processing, and electrical changes may be made. The progression of processing steps described is an example; however, the sequence of steps is not limited to that set forth herein and may be changed as is known in the art, with the exception of steps necessarily occurring in a certain order.

The term "pixel," as used herein, refers to a photo-element unit cell containing a photosensor and associated structure for converting photons to an electrical signal.

The embodiments described herein are presented in the context of a CMOS imager, which is employed in a digital still or video camera. However, this is but one example of an imager that may be used. Embodiments may be implemented using other image capture technologies such as, e.g., CCD. Indeed, embodiments described herein reduce blurriness and noise for any image captured using extended depth of field lenses, no matter which image capturing technology is used to capture the image.

In the processing described in the embodiments herein, there is a deliberate effort to reconstruct an original undegraded image based on prior knowledge about the degrading system, under clear optimality criterions, and based on a well-defined system model. After restoring image sharpness and reducing noise, images produced by the embodiments described herein may be further processed by conventional processing operations, such as demosaicing, white balancing, color correction, generic sharpening, and others to produce a final processed image.

Figure 1:
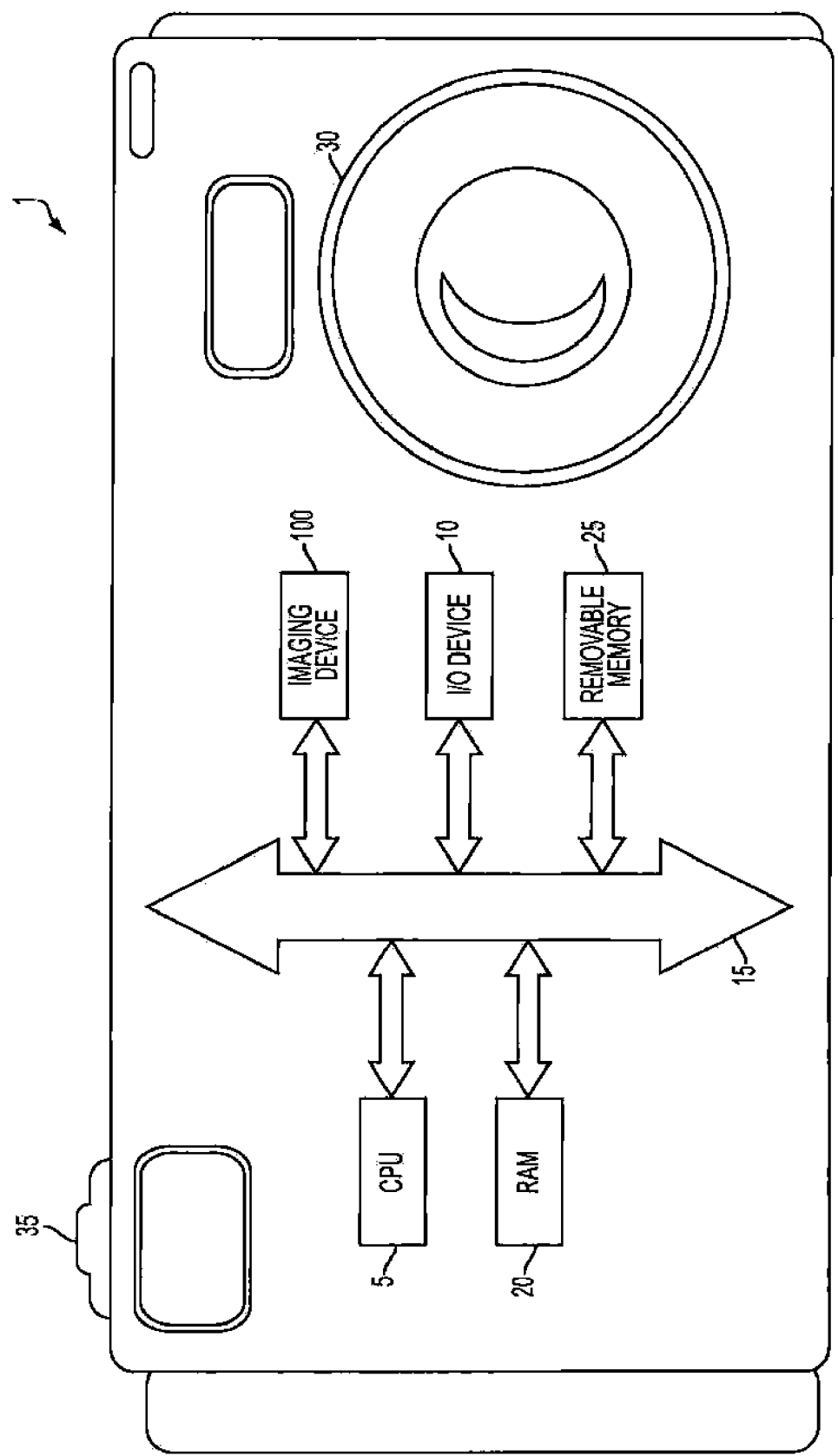
FIG. 1 is an embodiment of an imaging system which may implement an embodiment described herein.

Now referring to the figures, where like numerals designate like elements, FIG. 1 is an embodiment of an imaging system 1 implementing an embodiment of the invention. Imaging system 1, for example, a digital still or video camera system, which generally comprises an extended depth of field (EDOF) lens 30 for focusing an image on an imaging device 100 for sensing and capturing an image when shutter release button 35 is depressed. Imaging system 1 further includes a central processing unit (CPU) 5, such as a microprocessor for controlling camera operations and image focus, that communicates with one or more input/output (I/O) devices 10 over a bus 15. Imaging device 100 includes an internal memory 111 (FIG. 2), and also communicates with the CPU 5 over bus 15. The imaging system 1 also includes random access memory (RAM) 20, and can include removable memory 25, such as a flash memory, which also communicate with CPU 5 over the bus 15. Imaging device 100 may be combined with a processor, such as a CPU, digital signal processor, or microprocessor, with or without memory storage on a single integrated circuit or on a different chip than the processor.

Figure 2:
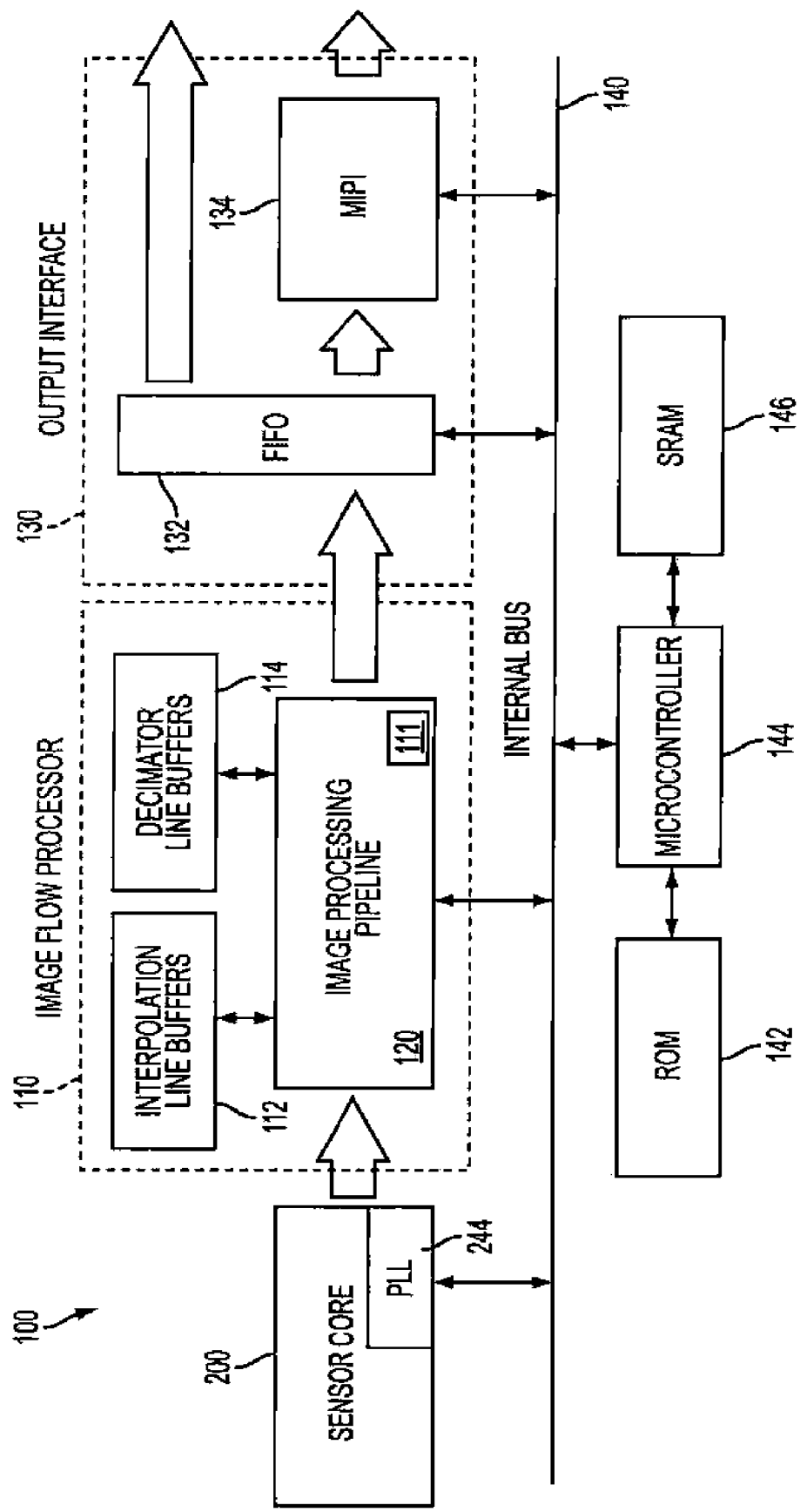
FIG. 2 is a block diagram of an imaging device which may implement an embodiment described herein.

FIG. 2 shows an embodiment of the imaging device 100. The FIG. 2 imaging device 100 may be implemented, though not required, as a system on a chip design, where all components illustrated, including those needed for image acquisition and processing, are fabricated on a single integrated circuit. The imaging device 100 may, as noted, use any type of image sensing technology, i.e., CCD, CMOS, etc.

The imaging device 100, as one example, comprises a CMOS sensor core 200 that communicates with an image flow processor 110 that is connected to an output interface 130. A phase lock loop (PLL) 244 is used as a clock for the sensor core 200. The image flow processor 110, which is responsible for image and color processing, includes interpolation line buffers 112, decimator line buffers 114, and an image processing pipeline 120. One of the functions of the image processing pipeline 120 is to perform image reconstruction and noise reduction on images captured using an extended depth-of-field lens, as well as demosaicing, color balance, and other known image processing operations.

The output interface 130 includes an output first-in-first-out (FIFO) parallel buffer 132, and a serial Mobile Industry Processing Interface (MIPI) output 134, particularly where the imaging device 100 is used in a camera in a mobile telephone environment. The user can select either a serial output or a parallel output by setting registers in a configuration register within the imaging device 100 chip. An internal bus 140 connects read only memory (ROM) 142, a microcontroller 144 and a static random access memory (SRAM) 146 to the sensor core 200, image flow processor 110, and output interface 130.

Figure 3:
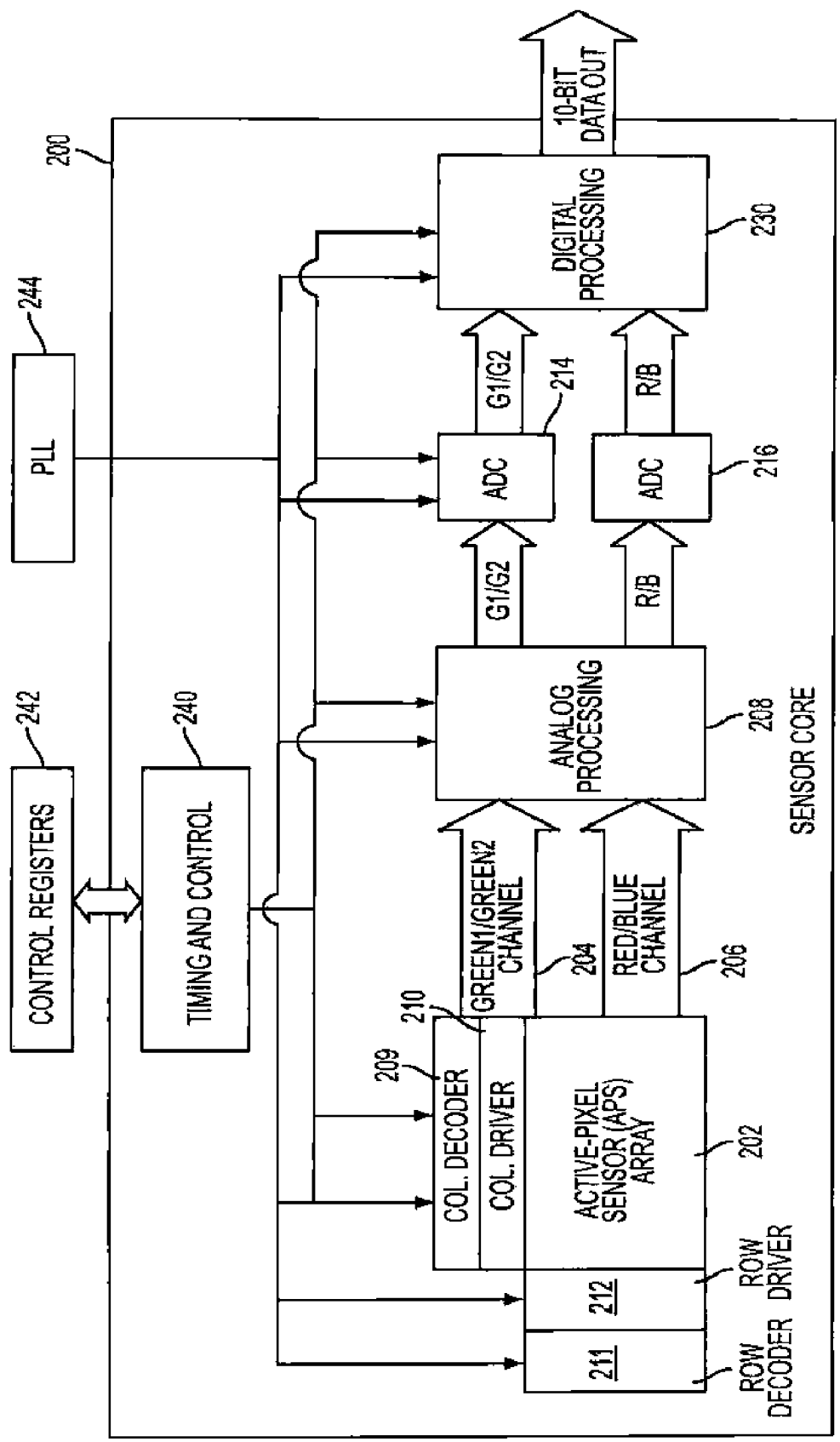
FIG. 3 is a block diagram of a sensor core depicted in FIG. 2.

FIG. 3 illustrates an example sensor core 200 used in the FIG. 2 imaging device 100. The sensor core 200 includes in one embodiment a CMOS imager pixel array 202, although any type of solid state array core and associated readout circuitry may be used. Pixel array 202 is connected to analog processing circuit 208 by a green1/green2 channel 204 which outputs pixel signal values corresponding to two green channels of the pixel array, and through a red/blue channel 206 which contains pixel signal values corresponding to the red and blue channels of the array. Embodiments described herein may also use monochromatic pixels.

Although only two channels 204 and 206 are illustrated, there are effectively four channels, since the green1 and green2 signals are read out at different times using channel 204, and the red and blue signals are likewise read out at different times using channel 206.

The analog processing circuitry 208 outputs RGB information as processed green1/green2 pixel signal values G1/G2 to a first analog-to-digital converter (ADC) 214 and processed red/blue signal values R/B to a second analog-to-digital converter 216. The outputs of the two analog-to-digital converters 214, 216 are sent to a digital processor 230, which forms a digital representation of a captured image.

In a CMOS imager, connected to, or as part of, the array 202, there are row and column decoders 211, 209 and row and column driver circuitry 212, 210 that are controlled by a timing and control circuit 240 to capture images using the array 202. The timing and control circuit 240 uses control registers 242 to determine how the array 202 and other components are controlled. As set forth above, the PLL 244 serves as a clock for the components in the core 200.

Pixel array 202 comprises a plurality of pixels arranged in a predetermined number of columns and rows. In operation, using a CMOS imager as an example imaging device 100, the pixels of each row and array are all turned on at the same time by a row select line and the pixels of each column within the row are selectively output onto column output lines by a column select circuit. A plurality of row and column lines are provided for the entire array 202. The row lines are selectively activated by row driver circuitry 212 in response to row address decoder 211 and column select lines are selectively activated by a column driver 210 in response to column address decoder 209. Thus, a row and column address is provided for each pixel. The timing and control circuit 240 controls the address decoders 211, 209 for selecting the appropriate row and column lines for pixel readout, and the row and column driver circuitry 212, 210, which apply driving voltages to the drive transistors of the selected row and column lines.

Each column contains sampling capacitors and switches in the analog processing circuit 208 that read a pixel reset signal Vrst and a pixel image signal Vsig for selected pixels. Because the core 200 uses green1/green2 channel 204 and a separate red/blue channel 206, circuitry 208 will store Vrst and Vsig signals for each of the green, red, and blue pixel signals as they are read out. A differential signal (Vrst−Vsig) is produced for each pixel by differential amplifiers contained within the circuitry 208 for each pixel output signal. Thus, the signals G1/G2 and R/B are differential signals representing respective pixel brightness values that are digitized by a respective analog-to-digital converter 214, 216. The analog-to-digital converters 214, 216 supply the digitized G1/G2 and R/B pixel signal values to the digital processor 230 which forms the digital image output (e.g., a 10 bit digital output). The output is sent to the image flow processor 110 (FIG. 2) for further processing. The image flow processor 110 will, among things, perform demosaicing, color correction, and other adjustments on the captured image digital pixel values applied thereto.

The image processing pipeline 120 of the image flow processor 110, which may be implemented as hardware circuits, a programmed processor, or a combination of hardware circuits and a programmed processor, performs a number of operations on the pixel signal values received thereat. The processor 110, memory 111, and pixel array 202 may be located on a single chip.

In the following description, it is presumed that there exists an ideal image (referred to as the original image) that represents the input to the imaging system 1 through the extended depth-of-field lens 30 and to imaging device 100. To this image, the extended depth-of-field lens 30 applies some blur according to point spread functions (PSFs) associated with the extended depth-of-field lens 30, and the imaging system 1 introduces other effects such as noise. All of the effects introduced by the imaging system 1 are called degradations. The objective of signal processing in accordance with the embodiments described herein is to recover a best estimate of the original image by using as input the degraded image produced by the imaging system 1, and information about the degradations that acted on the original image.

There are restoration formulations that can lead to closed-form solutions, which can enforce less complex and linear constraints on the solution, and other methods that are nonlinear in the form of the optimization criterion and can contain more complex constraints at the cost of increased computational requirements, as well as virtually always the need for iterative numerical solutions. In the latter case, one problem is the stopping criterion used for the iteration, and another is the robustness and predictability of the solution—too few iterations and the degradation is not removed sufficiently; too many, and noise is introduced in the solution. This phenomenon may vary across different types of image classes. On the other hand, closed-form solutions admit stable solutions but may lack the ability for gradual solution refinement that iterative methods can provide. The EDOF restoration embodiments described herein seek a compromise between the two restoration approaches of closed-form solutions and iterative solutions by utilizing an optimal linear and noniterative signal estimator at its core, while adapting it for a nonlinear solution. This is obtained through the adaptation of the core linear and non-iterative signal estimator to the local statistical properties of the image, as well as to other factors such as color channel, and, to a coarser degree, to depth of field.

The EDOF imaging system 1, including the EDOF lens 30 and the imaging device 100, has the following characteristics in terms of the degradations which are modeled. The blurring of the original image by the lens 30 happens through the blur point spread functions (PSFs) acting in each color channel. These PSFs ideally have the property that they are invariant with the depth of field in a large range (e.g., 25 cm to infinity), though in reality some variation will be present. However, in a range around best focus, these PSFs are broader compared to a conventional lens PSF at best focus. This is the already mentioned design tradeoff for the EDOF lens 30. One of the implications is that in image restoration a balance must be sought in terms of the "sharpness"-to-noise profile at different distances according to the design intent. The other variations of the PSFs that are important include changes of the PSFs with field height (variation across the image plane in all directions), as well as variation with color channel. For example, it is observed that the PSFs will vary more as the distance from the center of the image increases, and that different channels behave in a different way at different distances.

The EDOF processing employed in the embodiments herein has as input the information about the EDOF focus degradation (in the form of the PSFs that degraded the "original" image), as well as statistical information about the noise process associated with the imaging device 100 on which the EDOF image is captured. For restoration, the basic building block in the EDOF processing is a linear, minimum mean square error (LMMSE) estimator. However, this form of signal estimator is used in a specific adaptive manner which imparts a nonlinear nature to the overall EDOF processing. The core signal estimator may take the form of the known Wiener filter, or another non-iterative filter.

The image restoration solution presented accounts for the variation of the degrading PSFs (e.g., with field height), and for the non-stationarity of signal and noise statistics. The image restoration solution is highly adaptive, and performs a joint signal reconstruction and varying noise suppression. The emphasis is on the design of adaptive approaches for image restoration—these can use any core signal estimator in the process. An advantage of the disclosed embodiments is that a large amount of processing of the PSFs and noise model characteristics is done ahead of time to generate the restoration filter information, such that some preprocessed information based on the imaging system 1 is stored in the internal memory 111, while leaving some information based on the captured image to be processed by the imaging system 1, thus providing adaptability to the system.

The core signal estimator is described as the color EDOF image degradation problem, modeled as follows. Each color channel of the original image is denoted by $x_c(i,j)$, where $(i,j)$ indicates the spatial position of a pixel in a channel image (original, degraded, or restored), and where c identifies the color channel. Similarly, $y_c(i,j)$ is the corresponding degraded image and $n_c(i,j)$ is the corresponding noise image. The EDOF processing operates on the color-downsampled image received from the pixel array of the imaging device 100. The downsampling may be done according to the Bayer patterns where the images have the four Bayer pattern channels denoted by green1 (G1), red (R), blue (B), and greens (G2) as described above and shown in FIG. 3. Since each color channel is processed independently, the channel-identifying index c is dropped to simplify notation.

The spatial PSF that degrades a channel image is denoted by h (k,l), which may be different for each channel. In an embodiment the degrading kernel size representing the size of the PSF is the same for each channel and equal to a size M×M, where M is a number of pixels (the PSF can still be asymmetric (i.e., M×N) but upper-bounded in size).

The Wiener signal estimator provides a non-iterative solution to the problem of finding a LMMSE estimate of the original image, presuming that the degrading PSF and the second-order statistics of the signal and noise are available. The filter is typically derived in the frequency domain, and can be applied to the degraded image in the frequency domain, or, through an inverse transform, its spatial counterpart can be determined and applied to the degraded image as a convolution operator.

The form of the Wiener filter that will be used incorporates an additional parameter that allows the filter adjustment on a per-channel basis. If the frequency transform of the spatial degradation represented by the PSF for a channel is denoted by K, and by T(u,v) the frequency transform of the spatial restoration filter, then the restoration filter in the frequency domain is:

$$T(u, v) = \frac{K^*(u, v)}{|K(u, v)|^2 + \alpha \frac{S_{nn}(u, v)}{S_{xx}(u, v)}} \quad (1)$$

In equation (1), the "*" symbol denotes complex conjugations K(u,v) represents the frequency transform coefficients of the PSF h(k,l), $S_{xx}(u,v)$ and $S_{nn}(u,v)$ represent the power spectral densities of the original image and the noise respectively, and α is a channel-specific parameter.

The restoration filter needs information about the power spectral densities of the original signal and the noise. Even if such information were available for the case of the noise, it would typically be much more difficult to robustly estimate the statistics of the original image through measurements applied to the degraded image, especially in the context of limited computational resources.

As an approximation, a presumption of wide sense stationarity (WSS) and uncorrelatedness is made for both the noise and the signal. In this case, a simplification is made whereby the ratio of power spectral densities at each frequency in equation (1) is replaced by the ratio of the signal and noise variances (i.e., the signal-to-noise ratio (SNR)). In this case, the expression of the restoration filter in the frequency domain becomes:

$$T(u, v) = \frac{K^*(u, v)}{|K(u, v)|^2 + \alpha SNR^{-1}} \quad (2)$$

This formulation of the restoration filter requires the two-dimensional fast Fourier transform (FFT) of the degrading PSF, and an estimate of the signal-to-noise ratio based on the image data being processed. If the filter is to be applied in the spatial domain via convolution to the degraded image, then an inverse fast Fourier transform (IFFT) also has to be applied to T anytime the PSF or the signal-to-noise ratio changes.

An alternative to the Wiener filter can be implemented with a regularized solution using a Tikhonov-Miller constraint. It can be shown that the two are equivalent when the constraint has a specific form. Instead of using knowledge or a modeling of the signal statistics, a predetermined constraint (or penalty) L is imposed on the restored image (where L can represent any sharpening operator, for example, a Laplacian). If Q(u,v) denotes the transform coefficients corresponding to the constraint matrix L, and γ being a function of the noise statistics, the regularized restoration filter can be written as follows:

$$T(u, v) = \frac{K^*(u, v)}{|K(u, v)|^2 + \gamma |Q(u, v)|^2}. \quad (3)$$

The kernel-synthesis EDOF image restoration is described as follows. In the context of a spatial adaptation of the restoration, to account for the variation of the PSFs and signal and noise statistics in the image, the use of the restoration filters exemplified above would imply the need to use an inverse frequency transform (e.g., IFFT) to obtain the spatial restoration filter from the expressions in equation (2). This also presumes that the frequency transform coefficients K(u,v) and magnitudes $|K(u,v)|^2$ are stored with some degree of spatial granularity for the image plane (to avoid having to perform forward FFTs on stored spatial PSF data). This would consume storage and significant computational resources to support the FFT capability, for example. More importantly, such an approach would also limit the rate of adaptation to the variations in the PSF and local image statistics. Alternatively, one could derive the restoration filter directly in the spatial domain in response to changes in the local image statistics, but in the most general case this is computationally intensive, as well, or, if directly applied, would also limit the flexibility of the solution.

Thus, it is of interest to determine whether the need for an inverse transform (e.g., the IFFT) can be avoided, while still providing for the local adaptation of the image restoration and the flexibility afforded by the offline precomputation of filter characteristics and/or laws of adaptation without changing the implementation (e.g., hardware). If only one PSF and global signal-to-noise ratio may be used for deriving the restoration kernel to be applied to an entire image, this becomes unnecessary.

Such an approach would achieve three important objectives: a.) it provides for the adaptation of the image restoration to various degradation factors, which is critical for the case of an imaging system 1; b.) it enables the flexibility in formulating the processing solution for a given implementation as discussed above; and c.) it reduces storage and computational resources, and thus determines an efficient solution. The resulting approach for image restoration, which is described in the various embodiments below, is called the Kernel Synthesis Approach (KSA).

The form of the core signal estimator may be the filter expression in equation (2). There are two inputs that are needed for this filter: one is the PSF information, the other is the signal and noise statistics information. The PSF information is fixed (characterized) for a given lens design (but it varies along multiple axes, e.g., color channel, spatially in the image, and with distance to the object). The signal and noise statistics information is obviously dependent on the image being processed.

Prior information may be used as input to the KSA EDOF restoration. The first piece of information that is needed for the success of image restoration is related to the degradation PSF(s) that acted on the original image. These PSFs can either be measured based on the physical lens 30, or can be calculated from the complete lens prescription (if available). Both methods provide PSF information for each color channel, at desired positions in the image plane, and for different depths of field. The PSFs used as input to the restoration processing determine (in conjunction with the estimated signal and noise statistics) the restoration filter that will be applied to the degraded image to obtain the recovered image.

For the purpose of adaptation of the image restoration to the local variations in the degrading PSFs, a pre-determined sectioning of the image plane into tiles is performed. The local regions ("tiles") may have different shapes, but for illustration purposes it is presumed that they form a rectangular grid. For example, in a three-megapixel imaging device, there may be forty-eight such tiles. Each of these local image areas (in each color channel) is characterized by a "prototype" degrading-PSF for each color channel, which can be obtained either through a modeling process, or through measurements. The prototype PSFs may be taken (measured, or modeled) at a given depth of field, based on the characteristics of the lens 30 and the desired performance parameters (e.g., image restoration performance close-up versus at infinity, which is a sufficiently large distance between a subject and the camera (e.g., ten meters)). A single distance may be used for the PSFs to be used for restoration regardless of field height (e.g., tile position), or, based on the known properties of the lens 30, different distances for the PSFs may be taken for different tiles. Accordingly, different distances for the PSFs upon which restoration is based may be selected for different color channels.

Regardless of how they are obtained, the PSF set selected a priori to be used for the derivation of the restoration filters is not used directly by the restoration process. Rather, the information they carry is encoded off-line, into a data structure that is stored in memory 111 associated with the image processing pipeline 120 (FIG. 2), and thus accessible as input to the on-line restoration process. This implements an interface between the off-line filter derivation and the on-line filter application which enables the multifunctional feature of a given implementation. The approach taken for generating the above-referenced data structure is described below.

The other basic information needed by embodiments of the Kernel Synthesis Approach extended depth-of-field (KSA EDOF) processing consists of the second order statistics of the noise. A theoretical or empirical noise model can be used to provide the variance of the noise in the image at a desired spatial granularity. The noise model may also use imaging system 1 state information, such as the gain. The KSA further uses this information to estimate the original signal variance, which can be done with various degrees of precision and computation requirements, as discussed below. These quantities may be determined locally in an image, to enable a fine adaptation of the image restoration. In the embodiments described herein, the granularity of adaptation to the local image and noise statistics is not necessarily the same with that of the degrading PSF characterization; i.e., they may present different rates of adaptation for the restoration filter.

The following description of off-line kernel encoding presumes a given tile and color channel. Given the PSF information for a tile in the image, and an expected signal-to-noise ratio range for images produced by a sensor (or established a priori by the user), one can determine (e.g., using one of the equations (1), (2), or (3)) the estimators covering that the signal-to-noise ratio range for a given PSF. This can be easily accomplished by quantizing the signal-to-noise ratio range and deriving the corresponding restoration filters for each such pair of tile-PSF and quantized signal-to-noise ratio value in the range. The signal-to-noise ratio range can alternatively be taken to be different for different tiles, depending for example on the characteristics of the PSFs for the EDOF lens 30.

Thus, for illustration purposes, the signal-to-noise ratio interval ranges from s0 [dB] to s1 [dB] (integers) in 1 dB step increments, and there are P values in this set of signal-to-noise ratios. It should be appreciated that the interval and its sampling can be described in the linear domain rather than the logarithmic domain. For each tile and channel there is available as input information the PSF characterizing it, and the P sampled signal-to-noise ratio values. Therefore, P spatial restoration filters $t_i$, i=1:P, can be determined by taking the IFFT of the frequency domain filters obtained using equation (2), which is used as a preferred example and reproduced for convenience here:

$$T_i(u,v) = \frac{K_i^*(u,v)}{|K_j(u,v)|^2 + \alpha SNR_i^{-1}} \quad (4)$$

where K(u,v) represents the frequency transform coefficients of the PSF for a tile in a given channel, α is a channel-specific parameter (by default equal to one for all channels), T(u,v) represents the corresponding restoration filter in the frequency domain, and SNR is defined as:

$$SNR = \frac{\sigma_x^2}{\sigma_n^2} \quad (5)$$

In equation (5), $\sigma_x^2$ is the variance of the original (undegraded) signal, and $\sigma_n^2$ is the variance of the image noise. For the calculation in equation (5), only the signal-to-noise ratio decibel values in the interval [s0,s1] are required, which may be transformed to linear scale to be used in equation (4).

By taking the IFFT of a resulting frequency domain filter T(u,v) in equation (4), a spatial restoration filter $t_i$ is obtained (is operation takes place off-line). Each of the two-dimensional spatial filters $t_i$ and obtained vectors $z_i$ should be put in vector form through simple lexicographic ordering. These vectors may be gathered as the columns of a matrix Z. The size of each spatial restoration filter is M×M and, as specified above, there are P signal-to-noise ratio values for which these filters are computed. Therefore, the size of the filter data matrix Z is (M×M×P).

As it can be seen from equation (4), the restoration filter is a function of the tile PSF and a particular signal-to-noise ratio value. One approach for avoiding the use of the inverse transform to obtain the spatial restoration filter would be to derive off-line all of the filters corresponding to a tile PSF and the set of signal-to-noise ratio values, in the range [s0,s1], and store all of these filters for use at restoration time (on-line) based on a signal-to-noise ratio estimate done at some granularity in the image. This may incur a very large storage cost for the entire image (which has multiple tiles), and it may require a quantization of the signal-to-noise ratio values computed in the image, to the set of values that was used to derive the filters, to serves as inputs in a look-up table of restoration filters.

Instead, one can represent this restoration filter information contained in matrix Z, i.e., P points in M×M-dimensional space, for optimal efficiency. This essentially points to the need for a good representation basis, and the transform to achieve this representation. A good candidate for the representation is the principal component analysis (PCA) transform. The PCA has the property that for Gauss-Markov processes it will achieve maximal energy compaction of the representation for a given number of eigenvectors, among all linear transforms.

Thus, the restoration-kernel encoding methodology consists of representing each filter matrix Z corresponding to a tile, in a reduced-basis form. This is done for each color channel, as mentioned above. The representation consists of a fixed number of eigen-kernels retained (per tile), along with the coefficients required to reconstruct an approximation of any restoration filter in Z. Additionally, a method enabling the interpolation of restoration filters for the entire signal-to-noise ratio range (in addition to the sample ones stored in Z) is also provided.

For the determination of the eigen-kernels the singular value decomposition (SVD) technique is used in practice, and applied directly to matrix Z. The largest m singular values, which are retained based on the energy spectrum of the transform, identify the left m singular vectors to be retained as well, for the reduced-basis representation. The left singular vectors of the SVD representation correspond to the eigenvectors of the PCA representation for the matrix $C=ZZ^T$ (the data is centered prior to this representation).

Let the eigen-kernels retained for a particular tile as a result of performing PCA be denoted by $e_k$, k=1:m. In order to represent the original filter vectors $z_i$ in the new basis, the projection of these original vectors $e_k$ onto the new basis is performed as follows:

$$w_{i,k} = <z_i, e_k>, \quad (6)$$

where "< >" represents the scalar product of two vectors. Then, any filter representation $\tilde{z}_i$ (the reduced-basis approximation of the corresponding original $z_i$) can be written as:

$$\tilde{z}_i = \sum_{k=1}^{m} w_{i,k} e_k \quad (7)$$

As it can be seen, each reconstructed restoration filter $\tilde{z}_i$ can be represented as a linear combination of the eigen-kernels of the representation.

Clearly, this representation allows us to reconstruct, with a given amount of error for a number of eigen-kernels retained, any of the original set of restoration kernels $z_i$ that form the matrix Z. However, the signal-to-noise ratio range that is used for learning the features of the kernel space is described by a limited number of signal-to-noise ratio values. Arbitrary signal-to-noise ratio values may be estimated in an image. There are two options—one can quantize the estimated signal-to-noise ratio value at processing time back to the set of integer values used for deriving the filters, or parameterize the behavior of the weights $w_k$ in equation (6) such that an interpolated kernel reconstruction is made possible, as explained below. From a storage (and smoothness of restoration kernel adaptation) point of view, it is desirable to follow the latter approach.

Therefore, each set of weights $w_{i,k}|_{i=l}$ corresponding to a given vector $\tilde{z}_i$ and the set of P signal-to-noise values used for learning, is fit to a polynomial of order n in the signal-to-noise variable signal-to-noise ratio. Thus, the representation of the set of weights $w_{i,k}|_{i=l}$ becomes:

$$w_{i,k}|_{i=l} = f(SNR), \quad (8)$$

where f is the polynomial of order n.

With this representation, based on an arbitrary signal-to-noise ratio value, the weights necessary to perform the reconstruction in equation (7) can be determined by the corresponding polynomial evaluation in equation (8) with signal-to-noise ratio as a variable.

Therefore, the overall representation of the original kernel data in matrix Z for a tile k, in a given channel, contains the m retained eigen-kernels $e_k$, each of size M×M×1 coefficients, and the $n^{th}$-degree polynomial weight representations (m such polynomials corresponding to the m eigen-kernels) each translating into (n+1) polynomial coefficients. Thus, the total number of representation coefficients needed for a given tile and channel is given by [m*M×M+m*(n+1)] coefficients.

Adaptive EDOF image restoration is described as follows. The KSA image restoration of the embodiments is based on a joint signal reconstruction and noise management approach, which adapts to the local PSF, and signal and noise statistics. It is capable of doing so at a high rate of adaptation, with an efficient way for the restoration kernels to be computed (albeit with some approximation error) in response to local changes in the signal and noise statistics of the image. The adaptation to the local degrading PSF is limited directly by the amount of storage required to characterize these local changes.

The noise statistics may be obtained from a generic noise model (whether theoretical or empirical). The signal statistics may be estimated at processing time. The other input to the restoration method includes a data structure that contains the encoded eigen-kernels for a particular lens design, along with the polynomial coefficients required for kernel synthesis as detailed above.

A few versions of the KSA approach are possible as described next, depending on available computational resources. Also, the KSA enables a number of different methods to be used off-line to derive the restoration kernels that will be encoded in the KSA representation format—the KSA method has some transparency to the choice of particular core estimators, and it is primarily concerned with the way the estimator is used adaptively for image restoration. This transparency is the feature that enables a multifunctional solution, where, for example, a different filter expression could be computed off-line while the same KSA on-line process takes place. As another example, two different types of filters could be used corresponding to a division of the SNR range intro two regions (e.g., lower and higher SNR). As yet another example, the law of adaptation of the filter could be changed off-line without changing the on-line KSA implementation.

The general architecture of the KSA EDOF processing platform is described as follows. The Kernel Synthesis Approach (KSA) EDOF processing platform represents a scalable set of solutions for image restoration in the sense that it implements a progression of processing capacity at the cost of increasing storage and computational power needed.

Figure 4:
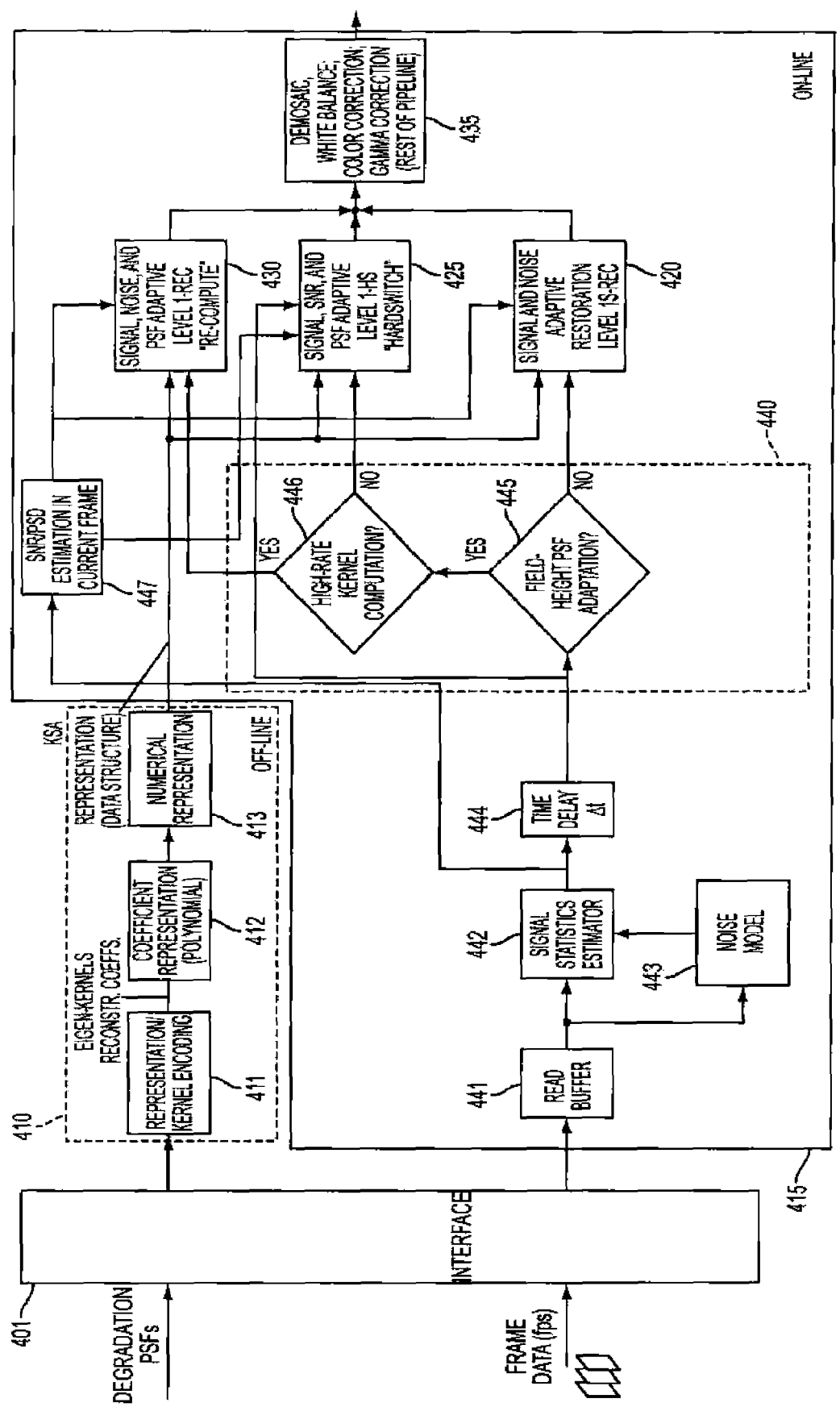
FIG. 4 is a block diagram showing processing options according to an embodiment described herein.

FIG. 4 is a block diagram showing KSA processing options 400 according to three different processing embodiments including respective processing operations 420, 425, 430, as described herein. The block diagram in FIG. 4 illustrates the input to the EDOF processing platform, which receives degraded images (frame data having a given frame rate (fps)) produced by the imaging device 100, and the degrading PSF information (measured, or modeled) associated with the lens 30. In KSA, the PSF information is received at an interface 401 and processed off-line as shown in off-line processing block 410. Off-line processing block 410 includes a representation/kernel encoding block 411, coefficient representation (polynomial) block 412 which receives eigen-kernels and reconstruction coefficients from block 411, and a numerical representation block 413 that creates a KSA representation (i.e., data structure) that is stored in memory 111 for use in the on-line image restoration processing. This results in an internal representation format for the restoration kernel, and it is used on-line for KSA image restoration.

The values (i.e., kernels) that are computed and/or determined off-line are stored in the internal memory 111 (FIG. 2) during manufacturing of the imaging system 1 for use during operation of the imaging system 1 (FIG. 1). This minimizes the amount of processing the imaging system 1 must perform during operation to restore a captured image, thus reducing total processing time, and allows the adaptation of the restoration.

The KSA EDOF platform provides adaptive restoration solutions. In the most general sense, the KSA implements adaptation to both the variation of the degrading PSFs and the signal/noise statistics across the image plane.

The on-line processing options illustrated in block 415 include, in increasing order of complexity and performance, KSA Level1S processing block method 420, which adapts locally to the signal and noise statistics but models the image as having been blurred by a single PSF, the KSA Level1 Hardswitch processing block method 425 that adapts to the field height variation of the PSFs (at tile level) and switches between two or more restoration filters based on the estimated local signal statistics, and KSA Level1 Re-compute processing block method 430 that adapts to the tile PSFs and re-computes the local restoration filters depending on these local estimates with a high rate of adaptation. These form different processing embodiments that may be used. FIG. 4 also shows other basic color processes 435 that would normally be found in the image processing pipeline 120. Each of the KSA processing block methods 420, 425, 430 receives the KSA representation from block 413, and provides an output to downstream processing block 435.

One of the KSA processing block methods 420, 425, 430 may be selected for the imaging system 1 during manufacturing; alternatively, any combination of the three processing block methods 420, 425, 430 may be made available for the imaging system 1 to select which one is to be used on-line. Interface 401 receives frame data, such as the number of frames per second (fps), which is sent to a read buffer 441. A signal statistics estimator restoration kernel 442, with or without a noise model provided in block 443, is used to estimate image variance statistics for the received image to generate an estimation of the variance $\sigma_x^2$ of the original signal. At this point, processing block 447 provides an optional local signal-to-noise ratio (SNR)/power spectral density (PSD) estimation in a current frame being processed, which is output to the three processing block methods 420, 425, 430. Selection of which KSA processing block method 420, 425, 430 to use may be performed according to decision block 440. It should be noted that although decision block 440 is within on-line processing block 415, decision block 440 may also be performed off-line.

If the optional local signal-to-noise ratio (SNR)/power spectral density (PSD) estimation is not used, an optional time delay Δt is introduced at block 444. The time delay block 444 allows for the asynchronous collection of data statistics in the image and the processing of the image. The result may be used directly by the Hardswitch processing block method 425, or a decision may be made at bloc 445 to determine whether a field height PSF adaptation is available. The field height is the distance of a particular point (or pixel) from the center of the lens (in a radial direction). If the determination results in a NO answer then the Level1S REC processing block method 420 is used. If the determination results in a YES answer, then at block 446, a decision is made to determine whether a high-rate kernel computation is needed. If the determination results in a NO answer, the Hardswitch processing block method 425 is used. If the determination results in a YES answer, then the Level1 Re-compute processing block method 430 is used. Again, it should be understood that block 440 may be performed on-line or off-line. In a preferred embodiment, block 440 would not be perform with a frame.

A description of the KSA adaptive processing block methods 420, 425, 430 is given as follows. As will be described in detail below, the KSA Level1 Re-compute processing block method 430 requires signal variance statistics to be recomputed for each pixel {i,j} or a given color channel, and a separate set of eigen-kernels to be read from memory for each tile k for a given color channel. The KSA Level1 Hardswitch processing block method 425 requires a separate set of eigen-kernels to be read from memory for each tile k for a given color channel and the signal variance statistics are recomputed for each pixel {i,j} for a given color channel and compared to the local noise variance statistics at the current pixel {i,j}. The KSA Level1S REC processing block method 420 is similar to the KSA Level1 Re-compute processing block method 430, but may use a single set of eigen-kernels for all pixels and tiles for a given color channel requiring less memory usage.

The preferred KSA Level1 Re-compute processing block method 430 is described with reference to the flowchart 500 shown in FIG. 5. The actual implementation of the approach is asynchronous, in that a statistics window of size M×M pixels scans the data ahead of the derivation and application of the spatial restoration kernel that performs a convolution in a window of size W×W pixels.

The operation of the KSA Level1 Re-compute processing block method 430 for a tile in an image being processed is now described. There are two options in terms of the eigen-kernels that are stored for each tile. The eigen-kernels for a single channel may be used for all channels. Alternatively, it is possible to perform a per-channel eigen-kernel characterization and use, at the cost of increased storage. In that case the eigen-kernels for each channel would be distinct. The flowchart 500 describes the processing in a single channel presuming that a set of eigen-kernels has been determined and stored for that channel. It should be understood that the process depicted in FIG. 5 is repeated for each color channel. Therefore, KSA representation values are generated at block 413 and stored in memory 111 for each color channel.

The process described below is repeated for each tile in the image. The tile counter k is set to "1" for the first tile (step 501). The representation data for the current tile k (as input to the KSA) may be prestored in memory 111 (FIG. 2) off-line, which includes the eigen-kernels $\hat{e}_l$ and the reconstruction coefficient parameterization as described above. The eigen-kernels $\hat{e}_l$ for the current file are read from memory 111 (step 502). A scalar value φ(h), shown as f(PSF(k)), characterizing the PSF h (i.e., the "strength" of the PSF) for that tile and channel (referred to as m(H)) is also read from memory 111 (step 503). The current pixel location {i,j} is set to the first pixel in the tile k (step 504). For each pixel in the tile k, an M×M window S centered at that pixel is used to perform original signal variance estimation in the following manner. The image data in the window is read (step 505), and the mean of the windowed data is computed (step 506). A noise model is used to estimate the variance of the noise $\sigma_n^2$ at the current pixel based on the input data provided to it (e.g., the mean of the image in the window S) (step 507). The noise model may also use imaging system 1 state information, such as the gain. Similarly, the variance $\sigma_y^2$ of the image data under the window S is computed (step 508). All the previous information computed for the current pixel position of the window S is used to determine an estimate of the variance $\sigma_x^2$ of the original signal taking into account both the degrading blur and noise acting on the original image (step 509). The estimation is done as follows:

$$\sigma_x^2 = (\sigma_y^2 - \sigma_n^2)/\phi(h), \qquad (9)$$

where $$\phi(h) = \gamma \sum_p \sum_q h^2(p, q), \qquad (10)$$

and γ is a parameter that is lens-design specific, and h is the PSF for the tile (and for a channel).

Based on the computations above, the signal-to-noise ratio SNR{i,j} at the current pixel is determined as in equation (5) (step 510). An optional course of action (step 511) includes comparing this signal-to-noise ratio with pre-established thresholds (step 512) (e.g., a lower bound on the signal-to-noise ratio, $SNR_{min}$) to which the restoration filter selected is a separate smoothing filter (e.g., pre-determined and stored filter) (step 513). The same effect can be obtained alternatively, by lowering the lower signal-to-noise ratio bound $SNR_{min}$ in the interval used off-line when determining and encoding the restoration kernels (FIG. 4, block 411). Alternatively, for the current pixel one could simply not process it (preserve the value observed) if the comparison with the lower signal-to-noise ratio threshold warrants it, and go directly to step 315.

If the optional path (i.e., step 511) above is not exercised (or the threshold comparison does not direct the process to execute it), the estimated signal-to-noise ratio at the current pixel is used as an input to the polynomial representation in equation (8) to determine the reconstruction coefficients $w_{i,k}$ to be used for computing the restoration kernel appropriate for the current pixel (steps 514, 515).

Then, the coefficients $w_{i,k}$ are used to linearly combine the eigen-kernels $\hat{e}_l$ stored for the current tile, as in equation (7), to determine the restoration kernel that is to be applied at the current pixel (step 516). Once that is done, a convolution of size W×W is performed at the current pixel using the determined restoration kernel (step 517). It should be noted that although W and M may be equal it is not necessary that they be so. An optional tile boundary interpolation (described below with reference to FIG. 16) may be performed (step 518). The restored pixel is written at step 519. The process then tests if the bounds of the current tile k have been reached, or whether all the tiles in the image have been processed. At step 520 the next pixel is selected, and in step 521, the current pixel {i,j} is tested to determine if it is within the selected tile k. If the determination results in a YES answer, then the process continues at step 505. If the determination results in a NO answer, then the next tile is selected at step 522, and at step 523 the current tile k is tested to determine whether there are additional tiles in the image. If the determination results in a YES answer, the process continues to step 502. If the determination results in a NO answer, then the end of the KSA processing has been reached.

As far as the sequential progression of the Level1 Re-compute processing block method 430 through the tiles in the image (for methods that use a tile structure in the image) is concerned, a method for exploiting the symmetries of the tiling in the image planet has been created as described below. This has the beneficial advantage of drastically reducing the storage required for the eigen-kernel $\hat{e}_l$ and weight-fitting coefficient data (referred to as the KSA data structure).

There are several symmetries that may be taken advantage of in effecting a major reduction in the storage requirements of data necessary in the extended depth of field (EDOF) image restoration methods. It is presumed that the grid is symmetric in X and Y, that the grid is made up of squares, and that the actual lens PSF is symmetric about the Field Height ray. Without these last two assumptions, symmetry about rays at angles other than 0° and 90° cannot be leveraged.

Figures 6, 7:
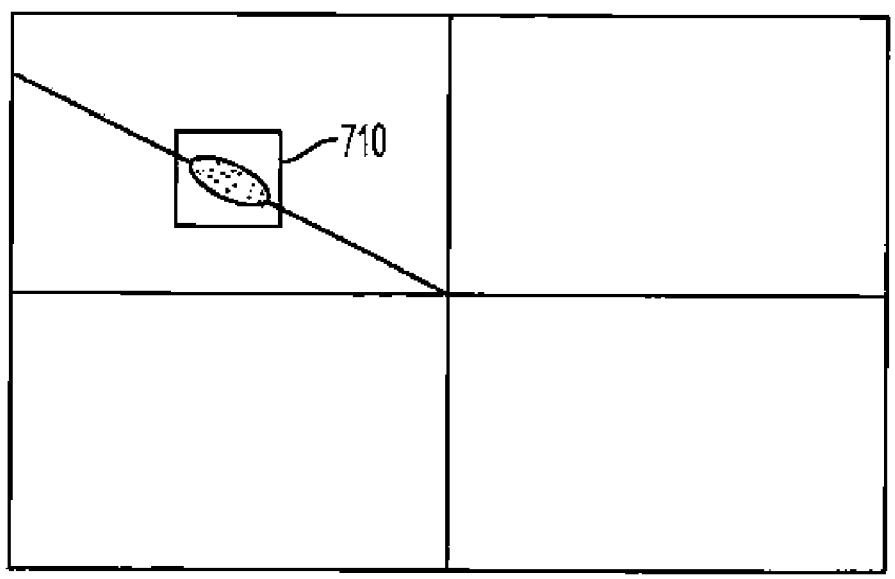
FIG. 6 is a grid of tiles used as a reference for an embodiment described herein.
FIG. 7 shows a point spread function for use with an embodiment described herein.

FIG. 6 is a grid of tiles used as a reference for an embodiment described herein. The notation used is (row, column) counting from 1. The X (bold line), Y (bold line), and 45° diagonals (dotted lines) are the lines of symmetry for the kernels. Symmetry about the Field Height ray of lens 30 may be presumed for PSF symmetry. The coefficients used attempt to invert the PSFs, but when they are also symmetric about the given axis, an illustration representing a PSF may be used, instead. FIG. 7 shows a PSF 710 for use with an embodiment described herein.

The PSF symmetry is preserved by rotation about the origin, but the grid squares and their normal addressing (assuming top-left to lower-right by rows) do not have such symmetry. There are three interesting cases: reflection in the X axis, reflection in the Y axis and reflection in one of the 45° diagonals. The first two can be handled by single dimensional flips or mirrors where one changes the indexing order or either the row addresses (for Y axis reflections) or the column address (for X axis reflections). In all these cases the coefficient addressing is always by row then column. Reflections in the diagonals require that the addressing order be by column then row. This can be visualized as a rotation but from an address indexing viewpoint it just switched the index that defines the 'row' offset.

In all illustrations described below, one array is denoted as the reference and the normal indexing (top-left-to-bottom-right-by-rows) of the other array is related to a new indexing of the reference array. In all cases the goal is to find the coefficient in the reference array that corresponds to a coefficient in the target array.

Figure 8:
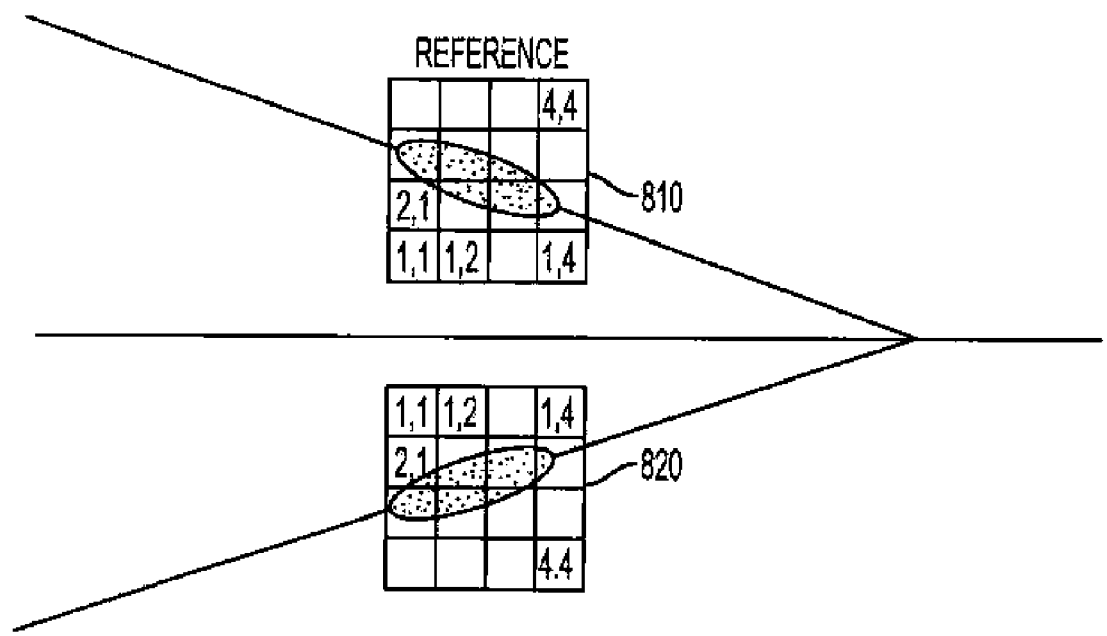
FIG. 8 shows point spread function matrices for use with an embodiment described herein having reflection about the X-axis.
Figure 9:
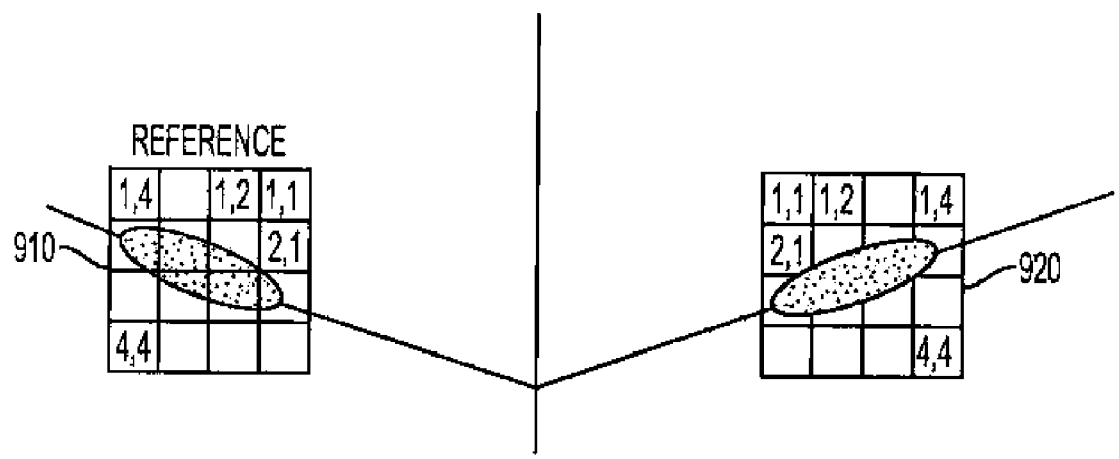
FIG. 9 shows point spread function matrices for use with an embodiment described herein having reflection about the Y-axis.
Figures 10, 11:
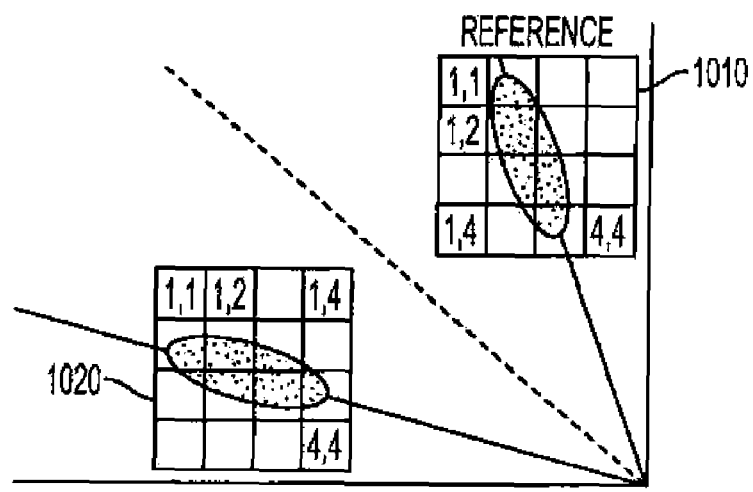
FIG. 10 shows point spread function matrices for use with an embodiment described herein having diagonal reflection about the 45° diagonal.
FIG. 11 is a block diagram of indexing according to an embodiment described herein.

FIG. 8 shows point spread function matrices 810, 820 for use with an embodiment described herein having reflection about the X-axis. The X reflection case results in a reversal of the row indexing order but is still row-then-column indexing. The Reference matrix 810 is used to obtain the pixel processing order for the target matrix 820. FIG. 9 shows point spread function matrices 910, 920 for use with an embodiment described herein having reflection about the Y-axis. In the Y reflection case, the order of column indexing is reversed, but is still row-then-column indexing. The Reference matrix 910 is used to obtain the pixel processing order for the target matrix 920. FIG. 10 shows point spread function matrices 1010, 1020 for use with an embodiment described herein having diagonal reflection about the 45° diagonal. In the diagonal reflection case, the row-column indexing order changes to column-then-row indexing. The Reference matrix 1010 is used to obtain the pixel processing order for the target matrix 1020.

Using the various mappings of FIGS. 8-10, one can produce eight different indexing orders for the various kernels for each tile. Table 1 summarizes these.

TABLE 1

| Identifier | Precedence | Row direction | Column direction |
|---|---|---|---|
| a | row | positive | positive |
| b | row | positive | negative |
| c | row | negative | positive |

TABLE 1-continued

| Identifier | Precedence | Row direction | Column direction |
|---|---|---|---|
| d | row | negative | negative |
| e | column | positive | positive |
| f | column | positive | negative |
| g | column | negative | positive |
| h | column | negative | negative |

Applying this to a square tiling approach (e.g., six rows by eight columns of square tiles), FIG. 11 shows an example mapping where the numbers 1-9 refer to the unique reference coefficient matrices and the letters a-h refer to the access order of the reference matrix appropriate for the position in the image (defined in Table 1). FIG. 11 is a block diagram of indexing according to an embodiment described herein. In this example the unique matrix identifiers 1a-9d are assigned in the order they fall when scanning the image from top-right to tower-left by rows.

FIG. 12 is a block diagram of indexing according to another embodiment described herein. The unique matrices 1a-9d are assigned, starting from the upper left of the central four tiles 1a-1d and working outward towards the upper right of the image.

FIG. 13 is a block diagram of indexing according to another embodiment described herein. FIG. 13 pictorially describes the order in which the reference matrices 810, 910, 1010 are indexed. The arrows show the order for processing the pixels within each tile 1a-9d.

Figure 14A:
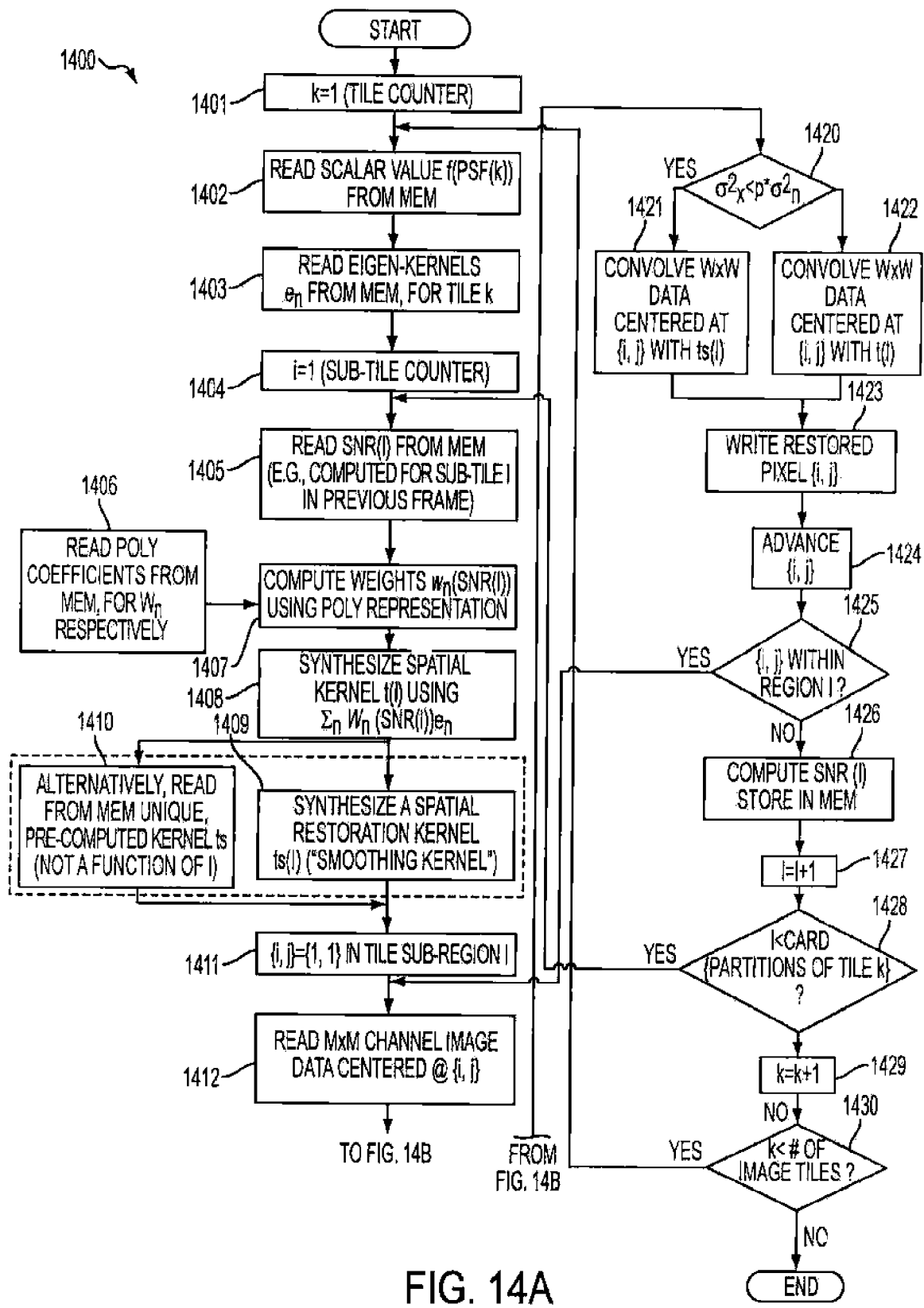
FIG. 14 is a flowchart of a process according to an embodiment described herein.
Figure 14B:
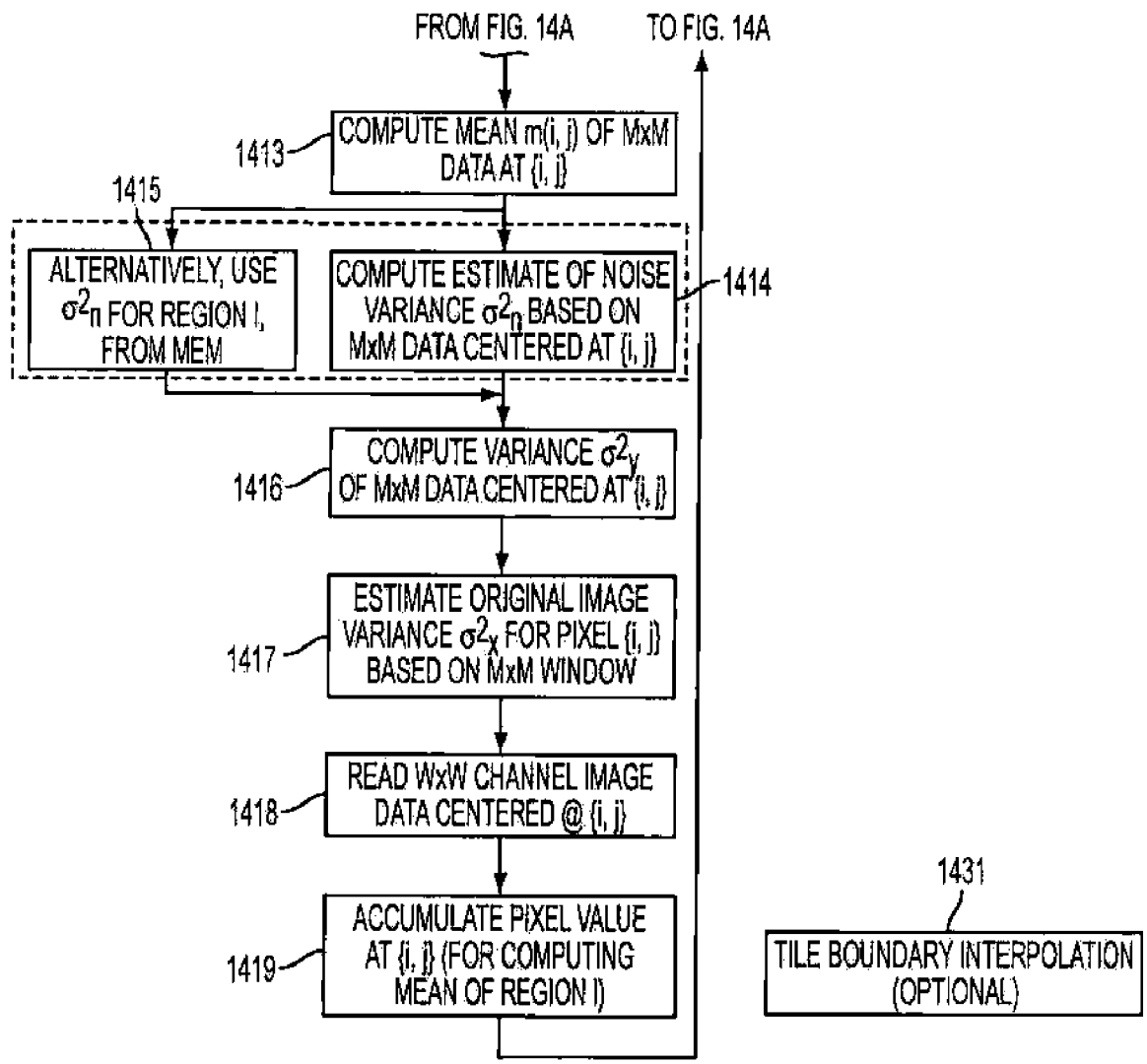

FIG. 14 shows method 430, a flowchart for the KSA Level1 Hardswitch processing block 425 which may be used to process signals in lieu of the KSA Level1 Re-compute block 430. The flowchart 1400 shows the processing of a given single color channel (i.e., red, green1, green2, or blue) and all color channels are processed according to the same method. The first main difference between the KSA Level1 Re-compute processing block method 430 and the Level1 Hardswitch processing block method 425 is that in FIG. 14, although a decision based on an estimated variance of the original signal continues to be made locally (e.g., at the pixel level), the restoration filter is not re-computed at that granularity, but rather is selected from a fixed set of filters based on the comparison of the locally-estimated signal variance with one or more thresholds. The FIG. 14 flowchart 1400 illustrates the case where a local decision is made (based on an the estimate original signal variance) to use one of two restoration filters, i.e., a predetermined or computed smoothing filter, or a core restoration filter determined based on the signal-to-noise ratio value and the eigen-kernels $ê_i$ stored for a given tile and color channel. In this sense, the space of restoration filters that can be computed is quantized more coarsely than in the case of the Level1 Re-compute processing block method 430, thereby reducing computation. The second major difference is that the signal-to-noise ratio values are only computed at the level of a tile or sub-tile (much more coarsely than in the previous method), and they are determined in the previous frame to the one currently being processed. For a sufficiently high frame rate, the signal-to-noise ratios of corresponding tiles in two successive frames should not differ very much.

The process described below is repeated for each file in the image. The tile counter k is set to "1" for the first tile (step 1401). The representation data for the current tile k (as input to the KSA) may be prestored in memory 111 (FIG. 2) off-line, which includes the eigen-kernels $ê_i$ and the reconstruction coefficient parameters as described above. A scalar value $\phi(h)$, shown as f(PSF(k)), characterizing the PSF h for that tile k and channel (referred to as m(H)) is also read from memory 111 (step 1402). The eigen-kernels ẽl for the current tile k are read from memory 111 (step 1403). At step 1404, a first sub-tile 1 is selected for the tile k, such that the sub-tile 1 is a group of pixels. It should be noted that sub-tile 1 may comprise the entire tile k. A signal-to-noise ratio SNR(I) is read for the sub-tile 1 (step 1405). The estimated signal-to-noise ratio at the current pixel {i,j} is used as input to the polynomial representation in equation (8) to determine the reconstruction coefficients $w_{i,k}$ to be used for computing the restoration kernel appropriate for the current pixel (steps 1406, 1407). Then, the coefficients $w_{i,k}$ are used to linearly combine the eigen-kernels ẽl stored for the current tile k, as in equation (7) to determine the restoration kernel that is to be applied at the cement pixel {i,j} (step 1408). Next, one of the two restoration filters, i.e., a predetermined or computed smoothing filter ts, or a core restoration filter ts(I) determined based on the signal-to-noise ratio value and the eigen-kernels ẽl stored for a given tile and color channel is selected (steps 1409, 1410).

At this point, the current pixel location {i,j} is set to the first pixel in the sub-tile 1 (step 1411). For each pixel in the sub-tile 1, an M×M window S centered at that pixel {i,j} is used to perform signal variance estimation in the following manner. The image data in the window is read (step 1412), and the mean of the windowed data is computed (step 1413). A noise model is used to estimate the variance of the noise $\sigma_n^2$ at the current pixel {i,j} based on the input data provided to it (e.g., the mean of the image in the window S) (step 1414). The noise model may also use imaging system 1 state information, such as the gain. Alternatively, $\sigma_n^2$ may be read from memory 111 and used for the entire sub-tile region 1 (step 1415). Similarly, the variance $\sigma_y^2$ of the image data under the window S is computed (step 1416). All the previous information computed for the current pixel position of the window S is used to determine an estimate of the variance $\sigma_x^2$ of the original signal taking into account both the degrading blur and noise acting on the original image (step 1417). The estimation is done as described above for the Level 1 REC processing block method 420.

At step 1418, the W×W channel image data centered at the current pixel {i,j} is read. Next, the pixel value of the current pixel {i,j} is accumulated for computing the mean of the sub-tile region 1 (step 1419). A decision is made to determine whether the ideal original image variance $\sigma_x^2$ is less than a threshold of a scalar p times the noise variance $\sigma_n^2$. If the determination results in a YES answer, then a convolution of size W×W is performed at the current pixel using the core restoration filter ts(I) (step 1421). If the determination results in a NO answer, then the convolution is performed using the predetermined filter t (step 1422).

An optional tile boundary interpolation (described below with reference to FIG. 16) may be performed (step 1431). The restored pixel is written at step 1423. The process then tests if the bounds of the current sub-tile 1 have been reached, or whether all the tiles in the image have been processed. At step 1424 the next pixel is selected, and in step 1425, the current pixel {i,j} is tested to determine if it is within the selected sub-tile 1. If YES, then the process continues at step 1412. If NO, then the signal-to-noise ratio of the sub-tile 1 is computed (step 1426). At step 1427 the next sub-tile is selected, and the current sub-tile 1 is tested to determine whether there are additional sub-tiles in the current tile k (step 1428). If the determination results in a YES answer, then the process continues to step 1405. If the determination results in a NO answer, then at step 1429, the next file is selected, and the current tile k is tested to determine whether there are additional tiles in the image (step 1430). If the determination results in a YES answer, then the process continues to step 1402. If the determination results in a NO answer, then the end of the KSA processing has been reached.

Figure 15:
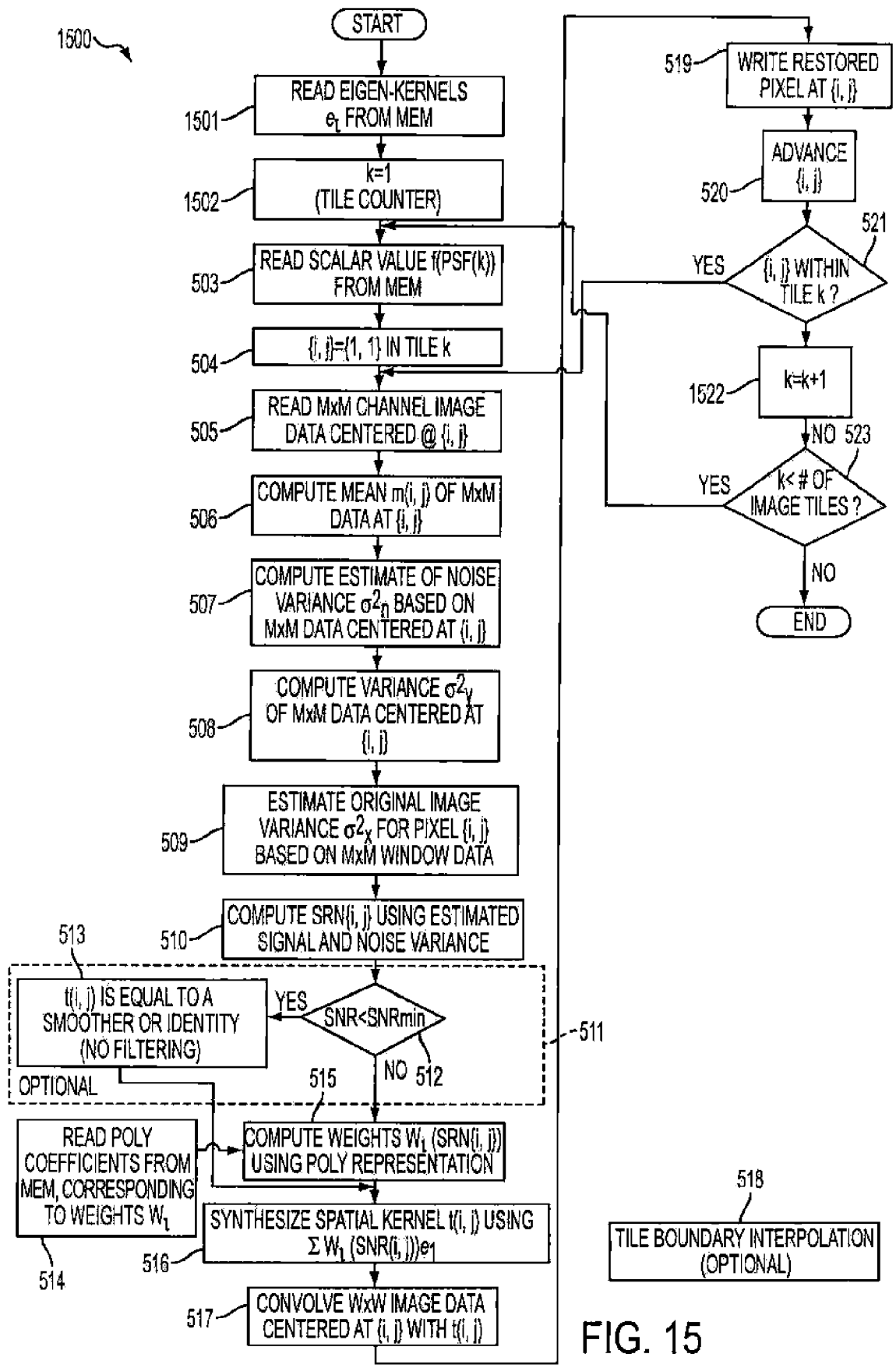
FIG. 15 is a flowchart of a process according to an embodiment described herein.

Alternatively, a single PSF can be used for the off-line derivation of the restoration kernels (rather than individual PSFs for each tile k), while all the other aspects of the above methods (whether "Re-compute" or "Hardswitch") remain the same. FIG. 15 shows a flowchart 1500 for the KSA. Level1S REC processing block method 420 which may be used to process signals in lieu of the KSA Level1 Re-compute block 430 or the KSA Level1 Hardswitch block 425. The specific information about the tile-level PSFs contained in the variable φ(h) can still be memorized and used to estimate the local signal variance. This mode of operation uses a single PSF for the entire image for deriving the restoration filter, but still adapts locally, as in the case of Level1 Re-compute processing block method 430, to the local signal and noise statistics. For example, the PSF at the center of the lens 30 may be used. Since only one set of eigen-kernels et is used for the entire image, it may be read from memory 111 (FIG. 2), at step 1501. Next the tile counter k is set to "1" for the first tile (step 1502). Steps 503-522 of flowchart 1500 are the same steps from flowchart 500, and are not described again here. At step 1522, if there are additional files in the image, then next tile is selected, and the process continues to step 503 (as opposed to step 523 continuing to step 502, as in FIG. 5).

Figure 5:
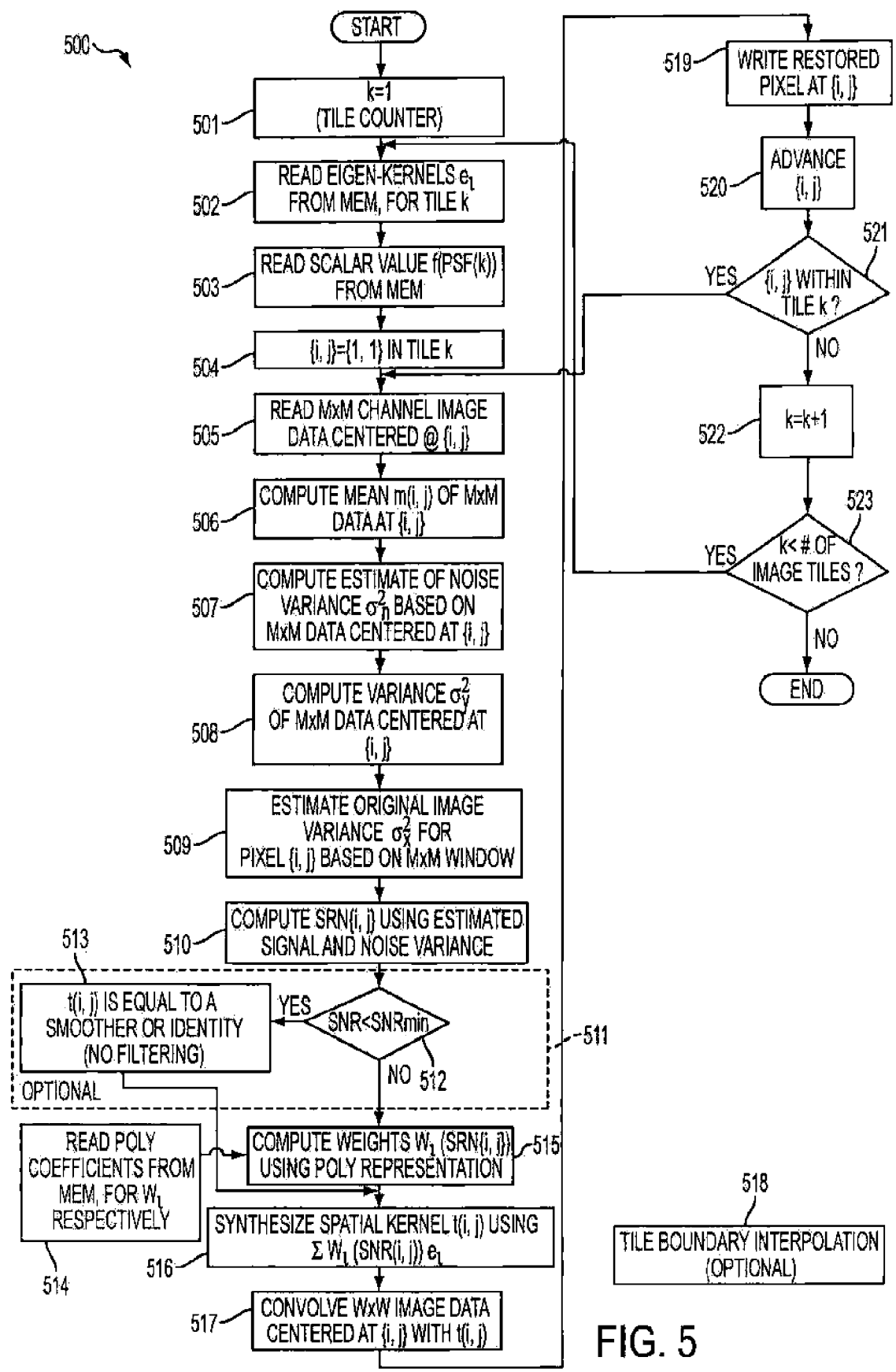
FIG. 5 is a flowchart of a process according to an embodiment described herein.
Figure 16:
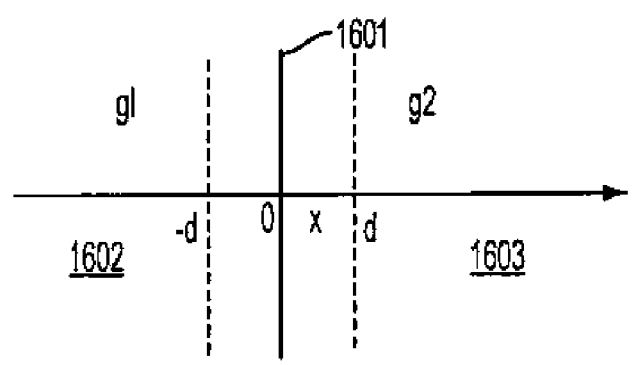
FIG. 16 is a diagram of a vertical boundary between two tiles.

An optional process of interpolating spatial kernels between neighboring tiles is also provided for all methods 420, 425, 430 (step 518 in FIGS. 5 and 15, step 1431 in FIG. 14). This interpolation acts in each of the channel images. FIG. 16 is a diagram showing a vertical boundary 1601 between two tiles 1602, 1603. The interpolation presented is a linear one, and it has one parameter—the distance d from either side of the boundary 1600 between two tiles 1602, 1603 where the interpolation is active. The spatial restoration kernels g1 and g2 are on either side of the tile boundary 1601, in a specific channel (i.e., red, blue, green1, green2), at a pixel in that boundary region (as illustrated in FIG. 16 for a vertical boundary).

The interpolated spatial kernel g1 that is computed for each of the pixels in the spatial band of width 2d around the tile boundary is determined as follows:

$$g1 = \frac{g2 - g1}{2d}x + \frac{g2 + g1}{2}, \quad (11)$$

where x is the distance from the boundary. As a special case, the pixels where four tiles meet (using the same overlap distance guideline of d) are treated by averaging the kernels corresponding to the four tiles (a more involved weighted interpolation could be performed).

Embodiments describe solutions for the restoration of images acquired by the imaging system 1 for the case of an extended depth of field (EDOF) imaging system. The inputs required by the processing module were described. The EDOF processing provides a set of scalable solutions depending on the availability of input information, and on the trade-off between the available computational resources and the capabilities of the image restoration processing.

The most general restoration solution accounts for the variation of the degrading PSFs with multiple factors including color channel field height, depth of field, and the changes in signal and noise statistics from image to image, as well as locally within an image. The core signal estimator used for restoration is optimized to take into account the degrading PSF characteristics. Given the variability of PSFs and the non-stationary nature of the noise and signal this restoration solution is made highly adaptive. To the intrinsic adaptation to spatial- and color channel-variant degradations, is added an adaptation to the noise-masking properties of the human visual system. Thus, the image restoration solutions jointly perform signal reconstruction and varying noise suppression depending on estimated local image statistics. The resulting overall EDOF restoration solution is nonlinear, and thus better matched to the specifics of the degradation process.

The processes and devices in the above description and drawings illustrate examples of methods and devices of many that could be used and produced to achieve the objects, features, and advantages of embodiments described herein. For example, although a Bayer color space is described, another color space or a luminance/chrominance (YUV) space may be used. Thus, they are not to be seen as limited by the foregoing description of the embodiments, but only limited by the appended claims.

What is claimed as new and desired to be protected by Letters Patent of the United States is:

1. A method of processing a captured image comprising:
receiving a captured image;
dividing the captured image into a plurality of tiles;
reading at least one prestored eigen-kernel from memory;
reading at least one scalar value from memory; and
for each pixel in the tile:
reading image data in an M×M window, where M is a number of pixels;
determining a mean of the windowed data;
estimating a variance of noise at a current pixel using the mean and a noise model;
estimating a variance of the image data in the window;
estimating a variance of an original image taking into account degrading blur, noise, and the variance of the image data; and
determining a signal-to-noise ratio at the current pixel, wherein estimating a variance of an original image is performed according to:

$$\sigma_x^2 = (\sigma_y^2 - \sigma_n^2)/\phi(h),$$

wherein $\phi(h)$ is a scalar value representing a strength of the point spread function, $\sigma_n^2$ is the estimated variance of noise, $\sigma_y^2$ is the estimated variance of the image data, and $\sigma_x^2$ is the estimated variance of the original image.

2. The method of claim 1 wherein the scalar value $\phi(h)$ is determined according to:

$$\phi(h) = \gamma \sum_p \sum_q h^2(p, q),$$

wherein $\gamma$ is a lens-design specific parameter, and h is the PSF for the tile (p,q).

3. A method of processing a captured image comprising:
receiving a captured image;
dividing the captured image into a plurality of tiles;
reading at least one prestored eigen-kernel from memory;
reading at least one scalar value from memory;
for each pixel in the tile:
reading image data in an M×M window, where M is a number of pixels;
determining a mean of the windowed data;
estimating a variance of noise at a current pixel using the mean and a noise model;
estimating a variance of the image data in the window;
estimating a variance of an original image taking into account degrading blur, noise, and the variance of the image data; and
determining a signal-to-noise ratio at the current pixel;
comparing the determined signal-to-noise ratio with a predetermined threshold; and
filtering the captured image signal according to one of:
if the determined signal-to-noise ratio is lower than the threshold, then determining reconstruction coefficients by either preserving a value observed or using a smoothing filter; and
using the determined signal-to-noise ratio at the current pixel as an input to a polynomial representation to determine reconstruction coefficients to be used for determining a restoration kernel appropriate for the current pixel.

4. The method of claim 3, further comprising:
using the coefficients to linearly combine the eigen-kernels stored for the current tile to determine the restoration kernel that is to be applied at the current pixel;
performing a convolution at the current pixel using the determined restoration kernel; and
replacing a pixel value for the current pixel with the convolved value.

5. The method of claim 3, further comprising, if the current pixel is located within a tile boundary region, interpolating a value for the pixel.

6. The method of claim 3, wherein the at least one prestored eigen-kernel is different for each tile.

7. A method of processing a captured image comprising:
receiving a captured image;
dividing the captured image into a plurality of tiles;
dividing each of the plurality of tiles into at least one sub-tile;
reading at least one scalar value from memory;
reading prestored eigen-kernels from memory;
determining a signal-to-noise ratio for the current sub-tile;
for each sub-tile:
using the determined signal-to-noise ratio for the current sub-tile as an input to a polynomial representation to determine reconstruction coefficients to be used for determining a restoration kernel appropriate for the current sub-tile; and
using the coefficients to linearly combine the eigen-kernels stored for the current file to determine a restoration kernel that is to be applied at the current pixel; and
for each pixel in the tile:
reading image data in an M×M window, where M is a number of pixels;
determining a mean of the windowed data;
performing one of:
estimating a variance of noise at a current pixel or reading an estimated variance of noise for the sub-tile from a memory;
determining an estimated variance of the image data in the window; and
determining an estimate of a variance of an original image taking into account both degrading blur and noise acting on the original image.

8. The method of claim 7, further comprising:
comparing the determined estimated original image variance with the estimated noise variance;
performing a convolution at the current pixel using the determined restoration kernel; and
replacing a pixel values for the current pixel with the convolved value.

9. The method of claim 8, further comprising if the current pixel is located within a tile boundary region, interpolating a value for the pixel.

* * * * *